Aug. 29, 1967    J. D. McLEAN    3,338,116
FILE GUIDE FOR SAW CHAINS
Original Filed Feb. 12, 1965    3 Sheets-Sheet 1

Inventor
James Duncan McLean
By Stevens, Davis, Miller & Mosher
Attorneys

United States Patent Office 3,338,116
Patented Aug. 29, 1967

3,338,116
FILE GUIDE FOR SAW CHAINS
James Duncan McLean, 217 Perreault St. W.,
Rouyn, Quebec, Canada
Continuation of application Ser. No. 432,151, Feb. 12,
1965. This application Nov. 16, 1966, Ser. No. 594,945
Claims priority, application Canada, Nov. 24, 1964,
917,144
4 Claims. (Cl. 76—36)

This application is a continuation of Serial Number 432,151, filed February 12, 1965, now abandoned.

This invention relates to a file guide for chain saws. More particularly, it relates to a combination file guide and depth gauge, setting gauge which when adjusted, can insure uniform sharpening of the teeth of the chain saw.

Chain saws of the type concerned utilize right and left hand cutting teeth for cutting away both sides of the kerf in the material being sawed and their cutting edges are generally concavely beveled. Sharpening is preferably done with a round file and the angle of the beveled cutting edge of all right and all the left hand cutting edges should be the same to insure proper operation of the saw.

In sharpening saw chains, many factors must be controlled. The side plate angle should be about 90° to the bottom of the cutter. If the cutting angle is negative (i.e. slopes back) cutting tends to be slow since the cutters tend to ride out of the cut and more pressure will be required to operate the saw. If the angle is positive (i.e. hook) the top plate will be feathered and tends to dull fast. In addition, the saw chain will tend to grab and many hang up in the cut.

The top plate filing angle (as will be described hereinafter with reference to FIG. 4B) should be about 35°. If the angle is less than 35° the side edge will be blunt and will not cut fast. If, on the other hand, the angle is greater than 35°, the side cutting edge will be feathered and will dull fast.

The top plate cutting angle, (as will be described hereinafter with reference to FIG. 4C), which is formed by the position in which the file is held, determines whether the cutter will be dull, sharp or have a feather edge. The angle should be about 60°. If the angle is less, a feather edge results, while if the angle is greater, the edge will be too blunt.

The depth gauge settings (as will be described hereinafter with reference to FIG. 4D) are important to efficient cutting and long chain life. If the depth is too low, cutters will bite into the wood, which results in the chain grabbing, jerking and hanging up and will also tend to overload the motor. If the depth gauges are too high, the cutters will not be able to bite into the wood and the chain will not cut to capacity. For average saw chains, the greater height of the cutter over the depth gauge should be from about 0.020″ to 0.030″, while for heavy saw chains, the difference in height is up to about 0.050″.

It is, therefore, an object of one aspect of this invention to provide a filing guide means for saw chains which will permit and control uniform sharpening of the cutter cutting edges while assuring the proper side plate angle, top plate filing angle, top plate cutting angle, and depth gauge settings.

By a broad aspect of the present invention a saw chain filing gauge is provided, comprising: an elongated channel frame adapted for receiving the said longitudinal edge of the cutter bar, said channel framework including an aperture for exposing the cutting edge of a cutter; slidably adjustable means adapted to abut the leading edge of a depth gauge of a first cutter; file support means rotatably mounted on said channel about a vertical axis disposed along the longitudinal axis of said channel for aligning a file with the exposed cutting edge of said first cutter; for providing a preselected plate filing angle and vertically adjustable depth gauge setting gauge means over a second aperture adapted for cooperating with a depth gauge of a selected cutter disposed on substantially the same plane along the cutting edge of the saw chain, for providing the proper depth gauge setting of the depth gauge of said cutter.

Figure 1:
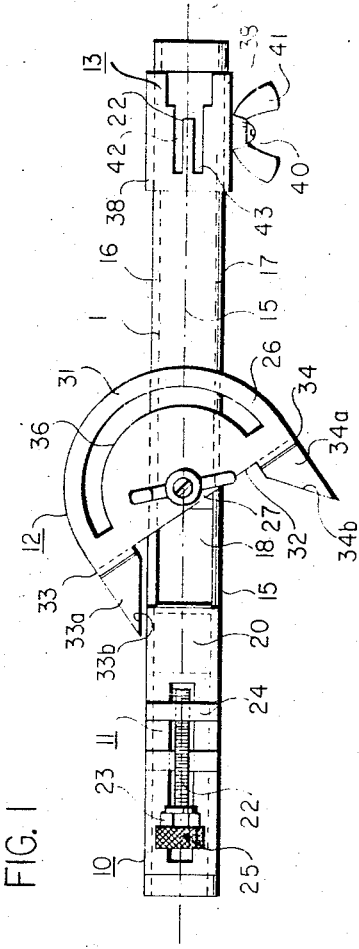
FIG. 1 is a top plan view of the file guide of the present invention.
Figure 2:
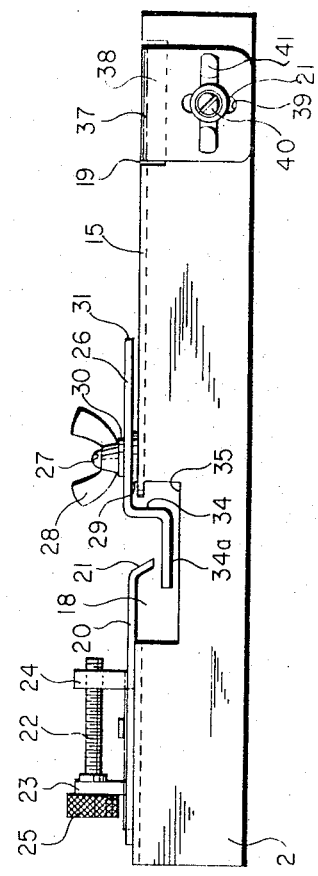
FIG. 2 is a side elevation of the file guide of the present invention.
Figure 3:
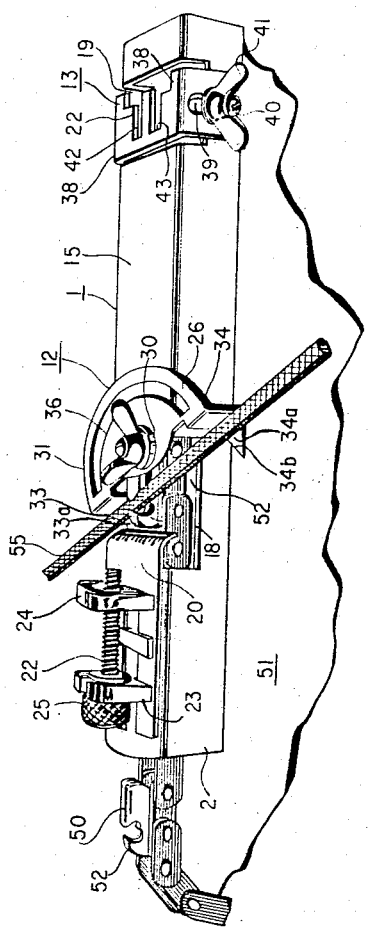
FIG. 3 is a perspective view of the file guide in position for use.

Before describing the aspect of the present invention disclosed in FIGS. 1–3, it is desired to consider the conventional saw chain shown in FIGS. 4A–4D. The saw chain 100 includes a depth gauge 101 and a cutter 102. Cutter 102 includes a top plate 103 and has horizontal sharp cutting edges 104 and vertical sharp cutting edges 105.

Figure 4A:
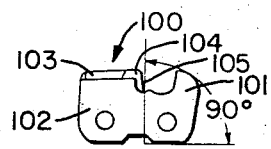
FIGS. 4A, 4B, 4C and 4D are views of a conventional saw chain showing the side plate angle, top plate angle, top plate cutting angle and depth gauge setting respectively.

Turning to FIG. 4A, it is seen that the side plate angle is the angle between the vertical sharp cutting edges 105 and the bottom of the saw chain.

Figure 4C:
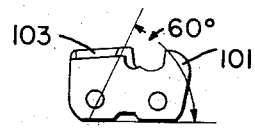
Figure 4D:
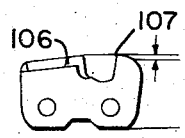
Figure 4B:
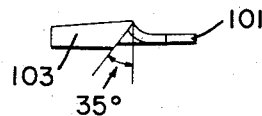

Turning to FIG. 4B, it is seen that the top plate filing angle is the angle, viewed from the top, between the side faces of the saw chain.

Turning to FIG. 4C, it is seen that the top plate cutting angle is the beveled angle of the generally horizontal cutting edge 104.

Turning to FIG. 4D, the depth gauge setting is the difference between the highest part 106 of the top plate 103 and the highest part 107 of the depth gauge 101.

The file guide shown in FIGS. 1–3 consists of a longitudinal channel from 10 on which is mounted an adjustable cutter guage 11, an angularly adjustable file guide 12 and a vertically adjustable depth gauge setting gauge 13 positioned over the aperture 19 in the channel frame for cooperating with saw chain depth gauges when the file guide fitted in place on the longitudinal edge of a saw chain.

The longitudinal channel frame 10 consists of an upper plate 15 and two substantially parallel side wings 16 and 17 and is formed with a fore aperture 18 and an aft aperture 19. Mounted on upper plate 15 of the channel frame 10 is an adjustable cutter gauge 11 which consists of a tongue member 20, having a downwardly depending leading edge 21. The cutter gauge 11 is longitudinally slidably adjustable in the direction of aperture 18 by means of an adjusting screw 22, which is threaded through support bracket 23 which, in turn, is rigidly secured to upper plate 15 and threading through sliding bracket 24 which is rigidly secured to tongue 20. Screw 22 is provided with a knurled knob 25 to assist in adjustments.

Mounted on the opposite side of aperture 18 and across from the tooth cutter gauge is an angularly adjustable file guide 12 which consists of plate 26 detachably secured to upper plate 15 by a bolt 27 and wing nut 28 assembly. As shown in FIG. 2, one washer 29 is inserted between upper plate 15 and plate 26 and another washer 30 is inserted between plate 26 and nut 28. These washers are ¹⁄₃₂″ thick and are used to provide the proper side plate angle 90°. For ¼″ files, no washer would be inserted between frame 15 and plate 26. For ⁷⁄₃₂″ files, one washer is used (as shown) while for ³⁄₁₆″ files two washers are used. The use of washers 29 and 30 with different sizes of files assures the proper filing depth of cutters and thereby assures the proper side plate angle of 90°. The plate 26 is bounded by a substantially semi-circular edge 31 and a substantially straight edge 32 facing aperture 18. Two integral file support legs 33 and 34 depend downwardly from straight edge 32. Support leg 34 extends downwardly to a position slightly above the lower edge 35 defining aperture 18 in wing 16 and terminates in an integral arm 34a substantially perpendicular thereto. Support leg 33 also extends downwardly to a position slightly above lower edge (not shown) defining aperture 18 in wing 17 and terminates in an integral arm 33a substantially perpendicular thereto. Arms 34a and 33a are substantially in aligment with each other and they serve to position the ends of a file 55 (see FIG. 3). One side of each of arms 33a and 34a is cut at an angle of approximately 35° to produce edges 33b and 34b, respectively, one of which will be substantially in line with wing 16 of the channel frame 10 when the angle of the file guide is fully extended in one particular direction, either left or right to provide the proper top plate filing angle either for left hand or right hand cutters. File guide plate 26 is also provided with a substantially semi-circular slot 36.

The depth gauge setting gauge 13 mounted over aperture 19 and generally comprises a U-shaped channel member designed to fit over the channel frame 10 and is comprised of a connector 37 integral with a spaced pair of downwardly depending legs 38. Each leg 38 is provided with a vertical slot 39. Passing through slot 39 and secured to its respective wing 17 or 18 is a bolt 40 with a wing nut 41 threaded thereon. Thus, by loosening nut 41, the depth gauge setting gauge may be moved upwardly or downwardly to provide the proper depth gauge setting, i.e. the amount the cutter is higher than the depth gauge. This may be achieved by means of sliding a flat feeler plate (whose thickness is equal to the desired depth gauge setting) between the underside of plate 15 and the top side of connector 37 and securing depth gauge setting gauge 13 in that position by tightening nut 41. The feeler plate is then removed.

The connector 37 is provided with a slot 42 (adapted to accommodate the right hand depth gauge of a saw chain) and a slot 43 (adapted to accommodate the left hand depth gauge of a left hand saw chain). Slots 42 and 43 are linked, for ease of manufacture.

The file guide device may be utilized for the sharpening of saw chain cutters as shown in FIG. 3 by arranging the longitudinal channel frame 10 with the plate 15 over the cutter 50 disposed along a longitudinal edge of a chain saw 51 so that a saw cutter 50 to be filed is positioned in aperture 18. The cutter gauge 11 is adjusted by means of adjusting screw 22 so that the leading edge 21 of cutter gauge tongue 20 engages the leading edge of depth gauge 52 of the saw chain cutter 50. Adjustment of the file guide by means of bolt and wing nut assembly 27, 28 is made to accommodate the angle of the beveled cutting edge of the cutter so that the cylindrical file 55 positioned on support plates 33 and 34 will be substantially in parallel with the beveled cutting edge. These two adjustments assure that the top plate filing angle will be about 35°. All the left hand cutters are sharpened in turn with the settings as mentioned.

Then the filing guide is rotated to the opposite extreme position so that right hand cutters can be so sharpened in turn.

Depth gauge setting gauge 17 is then vertically adjusted by means of bolt and wing nut assembly 40, 41 in order to obtain the correct depth gauge settings. The filing guide is then positioned so that the depth gauges 52 of the left hand cutters are within slot 43, and any excess height filed off. The depth gauges of the right hand cutters are similarly filed off by way of association in slot 42.

When the combination cutter guage, file guide and depth gauge setting gauge are thus set for the filing of a saw cutter, the filing guide device can be positioned on each of the other cutters of the saw chain and allowing for right and left hand positioning of the cutter cutting edges, uniform filing of all chain teeth can be assured by maintaining the filing guide adjustment. Thus, even a novice can sharpen saw chains while assuring the proper side plate angle, top plate filing angle, top plate cutting angle and depth gauge setting.

Another advantage of the present invention is due to its inverted U-shaped cross-section. It is now common practice to use "safety links" on chain saws, i.e. safety links alternating between cutters, mounted either at the centre or at the side. The filing gauge of the present invention is of such configuration that it does not rest on the safety link, thereby assuring that only the cutters will be sharpened.

What is claimed is:

1. A filing guide for use in the sharpening of beveled cutting edges of right and left hand cutters of a saw chain disposed along a longitudinal edge of a cutter bar, said filing guide comprising: an elongated channel frame adapted for receiving the said longitudinal edge of the cutter bar, said channel framework including an aperture for exposing the cutting edge of a cutter; slidably adjustable means adapted to abut the leading edge of a depth gauge of a first cutter; file support means rotatably mounted on said channel about a vertical axis disposed along the longitudinal axis of said channel for aligning a file with the exposed cutting edge of said first cutter, for providing a preselected plate filing angle, and vertically adjustable depth gauge setting gauge means over a second aperture adapted for cooperating with a depth gauge of a selected cutter disposed on substantially the same plane along the cutting edge of the saw chain, for providing the proper depth gauge setting of the depth gauge of said cutter.

2. An apparatus for sharpening the beveled cutting edges of right and left hand cutters of a saw chain disposed along a longitudinal edge of a cutter bar, comprising: an elongated channel frame adapted for receiving the said longitudinal edge of the cutter bar, said channel frame including an aperture for exposing the cutting edge of a cutter; slidably adjustable means adapted to abut the leading edge of a depth gauge of a first cutter; file support means rotatably mounted on said channel frame about a vertical axis disposed along the longitudinal axis of said channel frame for aligning a file with the exposed cutting edge of said first cutter, for providing a preselected plate filing angle, said angle being about 35°; and vertically adjustable depth gauge setting gauge means over a second aperture adapted for engaging the depth gauge of a selected cutter disposed on substantially the same plane along the cutting edge of the saw chain for providing the proper depth gauge setting of the depth gauge of said cutter.

3. A filing guide for use in the sharpening of beveled cutting edges of right and left hand cutters of a saw chain disposed along a longitudianl edge of a cutter bar, said filing guide comprising: an elongated channel frame member adapted for receiving the said longitudinal edge of said cutter bar, said channel frame including an aperture for exposing the cutting edge of a cutter; slidably adjustable means adapted to abut the depth gauge of a first cutter, said means including a tongue member for abutting the leading edge of said depth gauge of said first cutter, file support means rotatably mounted on said channel frame about a vertical axis disposed along the longitudinal axis of said channel for aligning a file with the exposed cutting edge of said first cutter, for providing a preselected plate filing angle said angle being about 35°; and vertically adjustable depth gauge setting gauge means over a second aperture, adapted for engaging the depth gauge of a selected cutter disposed on substantially the same plane along the cutting edge of the saw chain for providing the proper depth gauge setting of the depth gauge of said cutter.

4. A filing guide for use in the sharpening of beveled cutting edges of right and left hand cutters of a saw chain disposed along a longitudinal edge of a cutter bar, said filing guide comprising: an elongated channel frame adapted for receiving the said longitudinal edge of said cutter bar, said channel frame including an aperture for exposing the cutting edge of a cutter; slidably adjustable means adapted to abut the depth gauge of a first cutter, said means including a tongue member for abutting the leading edge of said depth gauge of said first cutter; file support means rotatably mounted on said channel about a vertical axis disposed along the longitudinal axis of said channel for aligning a file with the exposed cutting edge of said first cutter, for providing a preselected plate filing angle, said angle being about 35°; said file support means also being selectively vertically adjustable with respect to said channel frame; and a vertically adjustable depth gauge setting gauge disposed over a second aperture, adapted for engaging the depth gauge of a selected saw chain disposed on substantially the same plane along the cutting edge of the saw chain for providing the proper depth gauge setting of the depth gauge of said cutter.

No references cited.

GRANVILLE Y. CUSTER, Jr., *Primary Examiner.*